(12) United States Patent
Haglund (10) Patent No.: US 6,717,737 B1
(45) Date of Patent: Apr. 6, 2004

(54) MOBILE IMAGING SYSTEM

(76) Inventor: Kyle Haglund, 1019 California La. SW., Seattle, WA (US) 98116

(*) Notice: Subject to any disclaimer, the term of this patent is extended or adjusted under 35 U.S.C. 154(b) by 0 days.

(21) Appl. No.: 10/329,813

(22) Filed: Dec. 23, 2002

Related U.S. Application Data (60) Provisional application No. 60/343,357, filed on Dec. 21, 2001.

(51) Int. Cl.$^7$ .......................... G02B 27/14; G09G 5/00; H04N 7/00; H04N 9/04; H04N 5/232
(52) U.S. Cl. .......................... 359/631; 359/630; 345/7; 345/8; 348/115; 348/207.99; 348/211.99
(58) Field of Search ................................ 359/630, 631; 345/7, 8, 9; 348/53, 115, 207.99, 211.99, 721; 356/141.3

(56) References Cited

U.S. PATENT DOCUMENTS

| | | | | |
|---|---|---|---|---|
| 4,722,601 A | * | 2/1988 | McFarlane | 345/141.3 |
| 6,046,712 A | * | 4/2000 | Beller et al. | 345/8 |
| 6,304,234 B1 | * | 10/2001 | Horiuchi | 345/8 |
| 6,518,939 B1 | * | 2/2003 | Kikuchi | 345/8 |
| 6,556,240 B2 | * | 4/2003 | Oka et al. | 348/211.99 |
| 2002/0097197 A1 | * | 7/2002 | Togino et al. | 345/8 |
| 2002/0171604 A1 | * | 11/2002 | Tadysak | 345/8 |

OTHER PUBLICATIONS

"Action Sports Cams Helmet Cam," *Dirt Wheels Product Review*, Aug. 19, 2002, <http://www.actionsportscam.com/reviewdw.htm> [retrieved Dec. 11, 2002].

"Action Sports Cams Presents the Exciting Mini–Cam Hands–Free Video/Audio System!!" *Action Sports Cams Product Cam Cam Cam*, n.d., <http://www.actionsportscam.com/product.htm> [retrieved Dec. 11, 2002].

"Action Sports Cams Presents the Exciting Mini–Cam Hands–Free Video/Audio System!!" *Hat Cam Action Sports Cams*, n.d., http://www.actionsportscam.com/hat%20cam.htm> [retrieved Dec. 11, 2002].

"Action Sports Cams Presents the Exciting Mini–Cam Hands–Free Video/Audio System!!" *How It Works Action Sports Cams Hands Free Cam*, n.d., http://www.actionsportscam.com/hands%20free.htm> [retrieved Dec. 11, 2002].

"Action Sports Cams Presents the Exciting Mini–Cam Hands–Free Video/Audio System!!" *Snow Skiing Action Sports Cams Cam*, n.d., http://www.actionsports.com/ss.htm> [retrieved Dec. 11, 2002].

"Action Sports Cams Presents the Exciting Mini–Cam Hands–Free Video/Audio System!!" *Specifications Action Sports Cams Cam*, n.d., http://www.actionsportscam.com/specs.htm> [retrieved Dec. 11, 2002].

"Helmet Cameras," *Helmet Cameras by Sportzshot—Helmet Cam and Helmet Cam Accessories*, n.d., <http://www.sportzshot.com/helmet_cameras.htm> [retrieved Dec. 11, 2002].

"Why a Sportzshot Helmet Cam?" *Helmet Cameras by Sportzshot—FAQ's*, n.d., <http://www.sportzshot.com/helmet_cameras_faqs.htm> [retrieved Dec. 11, 2002].

* cited by examiner

*Primary Examiner*—Loha Ben
(74) *Attorney, Agent, or Firm*—Christensen O'Connor Johnson Kindness PLLC (57) ABSTRACT

A mobile imaging system (100) for capturing images of an environment surrounding a user and transmitting those images to a remotely located recording device (108) is provided. The system includes an imaging device (110) adapted to be worn by a user, receive light, and convert the received light into video signals amenable for recordation by the recording device. A communication system (104) is adapted to couple the imaging device in signal communication with the recording device and transfer the video signals therebetween. A switch (106) is coupled to the communication system, the switch adapted to control both operation of the imaging device and the recording device. The imaging device may be attached to a support member (102) adapted to be worn upon a head of a user. A visual indicator (114) may be used to communicate to a user an operating status of the recording device.

43 Claims, 7 Drawing Sheets

MOBILE IMAGING SYSTEM

CROSS-REFERENCE TO RELATED APPLICATION

This application claims the benefit of U.S. Provisional Patent Application No. 60/343,357, filed on Dec. 21, 2001, the disclosure of which is hereby expressly incorporated by reference, and priority from the filing date of which is hereby claimed under 35 U.S.C. § 119(e).

FIELD OF THE INVENTION

This invention generally relates to mobile imaging systems and more specifically to a head-mounted imaging device.

BACKGROUND OF THE INVENTION

Previously developed mobile imaging systems generally used large, expensive imaging devices positioned to one side or above a user's head, thereby contributing to parallax errors and/or interfering with a user's vision. In addition, previously developed mobile imaging systems lacked visual or audio indicators able to indicate a status of various operating parameters of a recording device recording video signals generated by the imaging device. Further, such mobile imaging systems lacked an audio recording device, such as a microphone, and most notably, lacked multiple microphones able to record sound data in a multi-channel format.

Still further, previously developed mobile imaging systems lacked a single switch adapted to control both the operation of a remotely located recording device and the imaging device. Thus, control of both the imaging device and the recording device requires multiple control buttons, leading to increased operating complexity and expense.

SUMMARY OF THE INVENTION

In accordance with one embodiment of the present invention, a mobile imaging system is provided. The mobile imaging system includes a support apparatus adapted to be worn by a user, and an imaging device coupled to the support apparatus. The imaging device is adapted to receive and convert light into video signals for recordation by a recording device.

The mobile imaging system further includes a communication system adapted to transmit video signals to the recording device. The mobile imaging system still further includes a switch coupled to the communication system. The switch is actuatable between first and second positions, wherein when the switch is actuated from the first position to the second position, a selected operating parameter of both the recording device and the imaging device is altered.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
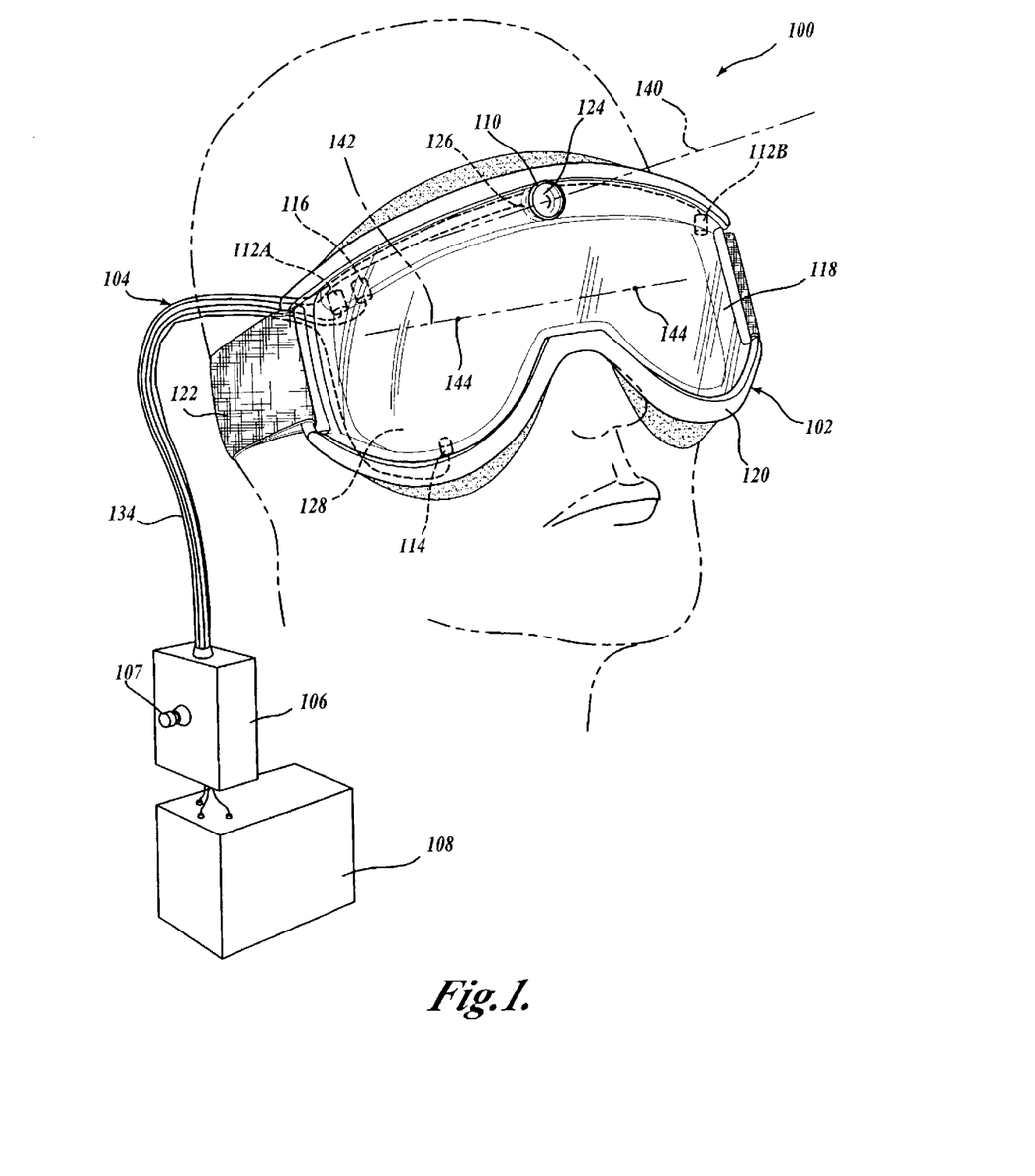
FIG. 1 is a perspective view of a mobile imaging system formed in accordance with one embodiment of the present invention.

FIG. 1 illustrates a mobile imaging system 100 formed in accordance with one embodiment of the present invention. The mobile imaging system 100 includes a support apparatus 102, a communication system 104 in communication with a control module 106, a recording device 108, an imaging device 110, a pair of microphones 112A and 112B, a visual indicator 114, and an audio indicator 116.

The support apparatus 102 is suitably goggles having a substantially transparent barrier 118 coupled to a frame 120. Also coupled to the frame 120 is a strap 122 for securing the goggles to a head of a user. Although the support apparatus 102 is shown as goggles, other types of support apparatuses, such as a baseball cap, visor, helmet, glasses, head lamp, hat, etc., are also within the scope of the present invention.

The recording device 108 is suitably a mobile recording device capable of receiving and recording video signals in a semi-permanent or permanent format for later retrieval or transmission to another location. For example, the video signals may be stored as magnetic patterns on a tape. As another example, the video signals may be stored as bytes of data on a digital storage medium. In still another example, the video signals are transmitted through a wireless communication network to a device or a remotely located user.

The recording device 108 is a well known, off-the-shelf component commonly referred to in the art and by the public in general as a "camcorder" or less frequently as a "video camera-recorder." Such recording devices 108 are light, compact, and able to operate for extended periods through a portable battery pack. The recording device 108 is suitably, although not necessarily, remotely located, such that the recording device 108 may be operated remotely of the imaging device 110. As a non-limiting example, the recording device 108 is worn in a fanny pack located on the waist of a user and is coupled by the communication system 104 to the head mounted imaging device 110.

The imaging device 110 receives visual information in the form of light reflected from the environment and converts the light into video signals amenable for recordation by the recording device 108. In the illustrated embodiment, the imaging device 110 is a well known off-the-shelf component often referred to as a "cam" in the art.

The imaging device 110 includes a lens 124. The lens 124 focuses light reflected from the surrounding environment onto a small semiconductor image sensor (not shown). This well-known sensor, such as a charge-coupled device (CCD), includes a plurality of light-sensitive diodes known as photosites. Each photosite is capable of measuring the amount of light (photons) received by the photosite and outputting a corresponding electrical signal. The aggregate of all of the electrical signals generated from the photosites are processed to form the video signals.

The imaging device 110 is preferably located on the support apparatus 102 such that an image axis 140 of the imaging device 110 is oriented in proximity to and aligned with the line of sight or image axis of a user's eyes. Oriented as described, when a user turns their head to look at an object, the image axis 140 of the imaging device 110 will also be pointed at the object. Placing the imaging device 110 as described also reduces parallax errors when viewing objects, especially objects at close range. Although the imaging device 110 may be placed any distance from an imaginary line 142 intersecting the center of the pupils 144 of a user's eyes, preferably the image axis 140 of the imaging device 110 is located within about four inches of the above defined imaginary line. In one embodiment, the image axis 140 is located within three inches of the imaginary line 142. In another embodiment the image axis 140 is located within two inches of the imaginary line 142, and in another embodiment, within one inch. In still yet another embodiment, the image axis 140 is located within a half-inch of the imaginary line 142, and in another embodiment, it is located on the imaginary line 142.

Still referring to FIG. 1, the imaging device 110 is coupled to the substantially transparent barrier 118 of the support apparatus 102. More specifically, the imaging device 110 passes through an aperture in the substantially transparent barrier 118 and is secured therein by any well known fastening methods, such as an interference fit with a grommet disposed in the aperture, or by placing well known O-rings 126 on each side of the substantially transparent barrier 118. The imaging device 110 may be protected from contaminate intrusion, such as moisture, dirt, etc., by encasing the imaging device in a protective housing. For instance, the imaging device 110 may be coated with a curable liquid or film to provide a protective housing.

In the illustrated embodiment, the imaging device 110 is disposed substantially within a cavity 128 formed in the frame 120, such that the lens 124 of the imaging device 110 is substantially flush with the substantially transparent barrier 118. In certain embodiments, the lens 124 extends outwardly a predetermined distance, such as about a ½ inch or less, from the transparent barrier 118. Oriented as such, the imaging device 110 provides minimal, if any, obstruction of the user's vision during use.

Coupled to the support apparatus 102 are a pair of microphones 112A and 112B. In the illustrated embodiment, the microphones 112A and 112B are well known miniature microphones. In the illustrated embodiment, one of the microphones 112A is positioned to receive sound originating from the right side of the user, and a second microphone 112B is positioned to receive sound originating from the left side of the user.

Thus, stereo sound recordings of the sound environment surrounding the user may be made by coupling the microphones 112 to the remotely located recording device 108 by methods well known in the art.

Although in the illustrated embodiment two microphones 112 are depicted, it should be apparent to those skilled in the art that any number of microphones 112, or none at all, are suitable for use with and in accordance with the scope of the present invention. For instance, one microphone 112 may be used if mono sound recording is desired, or if surround sound is desired, multiple microphones 112, such as five microphones 112, each oriented to record sound in a specific zone of the environment surrounding the user may be used. Further, should the recording device 108 require amplified audio signals, it should be apparent to those skilled in the art that an amplification system (not shown) may be coupled to the microphones 112 to satisfy such a requirement.

Still referring to FIG. 1, the visual indicator 114 will now be described in greater detail. The visual indicator 114 is coupled to the support apparatus 102 and in signal communication with the communication system 104. The visual indicator 114 is adapted to visually indicate to a user an operating status of the recording device 108. In the illustrated embodiment, the visual indicator 114 is visible to a third person and the wearer of the mobile imaging system 100 so that both the third person and the wearer will be aware when recordings are taking place. Such might be the case when public servants (e.g., police, firemen, security personnel, etc.) are recording a particular event, and some indication is required by law or custom to indicate when people are being recorded. In an alternate embodiment, the visual indicator 114 is visible only to the wearer of the mobile imaging system 100. In another alternate embodiment the visual indicator 114 is visible only to those surrounding the wearer of the mobile imaging system 100.

The visual indicator 114 emits light in a selected manner, such as by blinking in a specific pattern, turning off, turning on, changing color, changing intensity, etc. to indicate a status of various operating conditions or the remotely located recording device 108. For example, the visual indicator 14 may indicate operating conditions such as the recording device 108 is in a standby to record mode, record mode, power-off condition, power-on condition, play mode, end or near end of recording media capacity condition, battery low condition, that the remotely located recording device, communication system or imaging device is malfunctioning, etc. by emitting (or not emitting) light in a selected manner.

In the illustrated embodiment, the visual indicator 114 emits a light of constant intensity when the remotely located recording device 108 is recording, displays a blinking light source when a recording media capacity has reached a maximum capacity and turns off when the remotely located recording device 108 is in a power off condition.

Although a single visual indicator 114 is illustrated, it should be apparent to those skilled in the art that a plurality of visual indicators may be employed without departing from the scope of the present invention. Further still, although the visual indicator 114 of the illustrated embodiment is described as a light source, it should be apparent to those skilled in the art that non-light based visual indicators, such as a semaphore, are also within the scope of the present invention.

The audio indicator 116 of the illustrated embodiment is a well known miniature audio speaker adapted to audibly indicate an operating status of the mobile imaging system 100. To indicate operating status of the mobile imaging system 100, the audio indicator 116 emits sound waves in a selected manner, such as by pulsing sound in a specific pattern, failing to emit sound, constantly emitting sound, changing tone or emitting a different tone, changing intensity or emitting a different intensity, by emitting words of a known language, etc. For example, the audio indicator 116 may indicate whether the operating conditions of various components of mobile imaging system 100, such as the recording device 108, imaging device 110, and/or the communication system 104, is in a standby to record mode, record mode, a power-off condition, power-on condition, play condition, end or near end of recording media capacity, battery low condition, malfunctioning, etc., by emitting (or not emitting) sound in a selected manner.

Although the illustrated embodiment is depicted with a single audio indicator 116, it should be apparent to those skilled in the art that a plurality of audio indicators 116 may be employed without departing from the scope of the present invention. Further still, although the audio indicator 116 is described as an electronic audio speaker, it should he apparent to those skilled in the art that other audio indicators, such as a mechanical sound source that may click, ring, etc., are also within the spirit and scope of the present invention.

Although the microphones 112 and audio indicator 116 of the illustrated embodiment are described for performing a specific function, it should be apparent to those skilled in the art that the microphones 112 and audio indicator 116 may also serve other functions. For instance the audio indicator 116 may be attached to a sound generation source, such as a compact disc player, MP3 player, radio, etc., or the microphones 112 and audio indicator 116 may be coupled to a communication device, such as a two way radio for communication to other users in the area.

The communication system 104 provides signal and power interconnection between the various components of the mobile imaging system 100. In that regard, the communication system 104 couples the control module 106, the recording device 108, the imaging device 110, the pair of microphones 112, the visual indicator 114, and the audio indicator 116 in signal and power communication with one another. In the illustrated embodiment, the various components of the mobile imaging system 100 are coupled to one another by a plurality of wires 134. Although a plurality of wires are described, it should be apparent to those skilled in the art that the communication system 104 may transfer signals between the components in other manners, such as by wireless communication systems, and, therefore, a wireless communication systems are also within the scope of the present invention and include within the term "communication system."

The control module 106 is in signal communication with the imaging device 110, recording device 108 and all of the other auxiliary components, such as the microphones 112, visual indicator 114, and audio indicator 116. The control module 106 permits selective operation by the user of the imaging device 110, the recording device 108, and all of the other auxiliary components, as will he described in more detail below in reference to the wiring diagram of FIG. 2.

The control module 106 includes a switch 107. The switch 107 is actuatable between first and second positions, wherein a selected operating parameter of the imaging device 110 and/or the recording device 108 is modified. In the illustrated embodiment, when the switch 107 is actuated into the first position, the imaging device 110 and recording device 108 are configured into a power on configuration.

When the switch 107 is actuated into the second position, the imaging device 110 and the recording device 108 are each configured in a power off mode.

In one embodiment, the switch 107 is a well known push button switch, that when pressed, toggles the switch 107 between the first and second positions. Therefore, a user, through one touch of the switch 107, may selectively toggle the mobile imaging system 100 between power-on and power-off conditions.

Although in the illustrated embodiment the switch 107 is described as having only a first and second position, it should be apparent to those skilled in the art that the switch 107 may also include a number of positions greater or less than two, where each position is operable to control an operating parameter of the imaging device 110 and/or the recording device 108. For instance, the switch 107 may have a third position, wherein the mobile imaging system 100 is switchable between a standby and record mode, a fourth position to control the zoom or focus aspect of the imaging device 110, a fifth position to rewind a tape upon which the images arm being recorded, a sixth position to pause the recording of the video signals, etc.

Further, although in the illustrated embodiment the switch 107 is described as a push button switch, it should be apparent that other types of switches, such as rotary, toggle, touch activated, etc., are also within the scope of the present invention. Still further, although only a single switch 107 is depicted, it should he apparent to those skilled in the art that multiple switches may be utilized in the mobile imaging system 100 to enhance the operating choices of the mobile imaging system 100.

Figure 2:
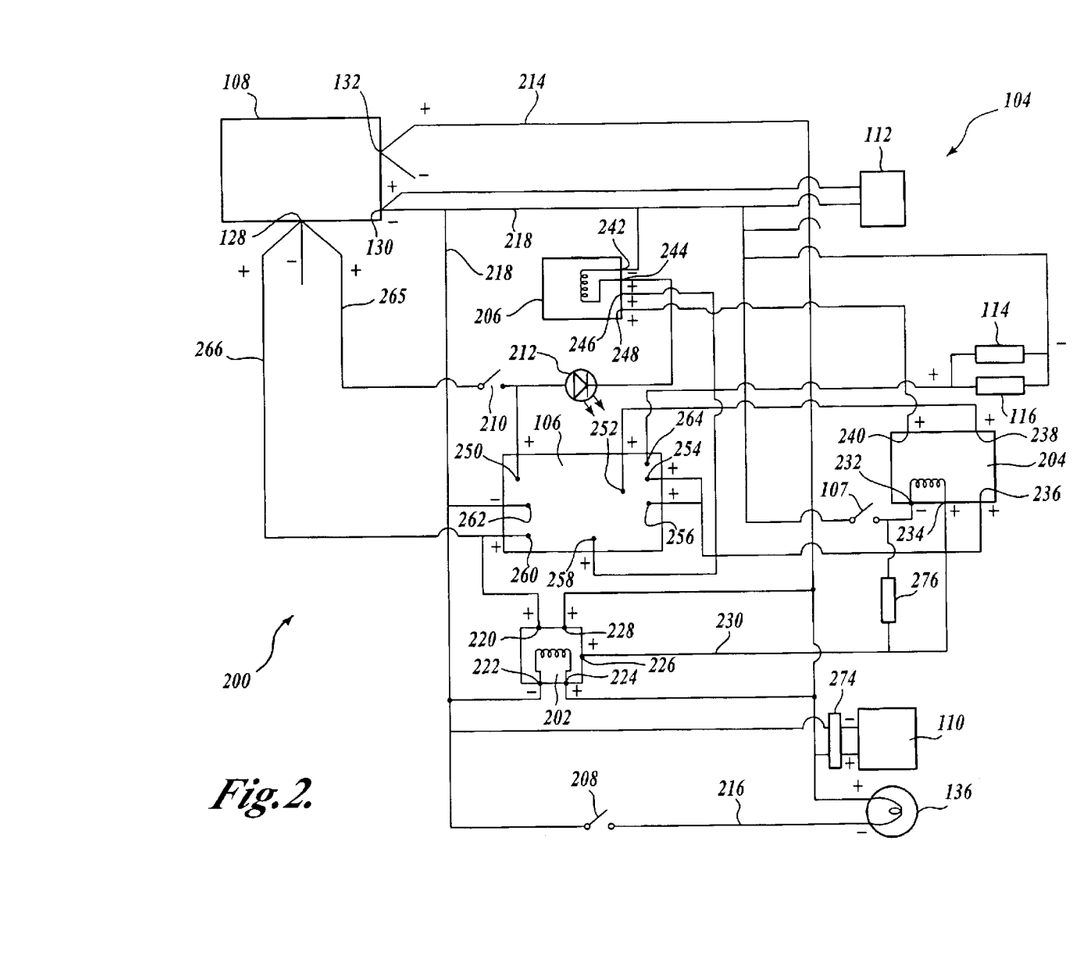
FIG. 2 is a diagrammatical wiring diagram of a mobile imaging system formed in accordance with one embodiment of the present invention.

Referring to FIG. 2, a diagrammatical wiring diagram of the mobile imaging system 100 will now be described in greater detail. The diagram depicts one method of coupling a recording device 108 with the mobile imaging system 200. As noted above, the recording device 108 is a standard off-the-shelf recording device, such as camcorders manufactured by SONY or CANNON having Local Area Network Connection (LANC) capabilities. The communication system 104 couples to a LANC port 128, an audio/video port 130, and a charging port 132 of the recording device 108. The control module 106, which generates command signals to control the operation of the recording device 108, is shown at the center of the diagram.

The major components of the communication system 104 include, a first relay 202, a second relay 204, a third relay 206, the control module 106, the switch 107, a second switch 208, a third switch 210, a diode 212, a microphone 112, the visual indicator 114, the audio indicator 116, a converter 274, a buzzer 276, and wiring interconnecting the various components.

A main power line 214 connects to a positive side of the charging port 132 of the recording device 108 to draw power off from a power source, such as a battery, of the recording device. The power is delivered to major load sources, such as the imaging device 110 and the light 136, when the recording device 108 is configured in a power on configuration.

The first relay 202 suitably includes five terminals 220–228. The second and third terminals 222 and 224 are coupled to an actuation coil, the actuation coil adaptable to toggle an internal switch of the first relay 202. The internal switch of the first relay 202 is normally positioned such that the fourth terminal 226 is in continuity with the first terminal 220. When the actuation coil is actuated, the internal switch of the first relay 202 is toggled such that fourth terminal 226 is in continuity with the fifth terminal 228.

The second relay 204 suitably includes five terminals 232–240. The first and second terminals 232 and 234 are coupled to an actuation coil, the actuation coil adaptable to toggle an internal switch of the second relay 204. The internal switch of the second relay 204 is normally positioned such that the third terminal 236 is in continuity with the fifth terminal 240. When the actuation coil is actuated, the internal switch of the second relay 204 is toggled such that third terminal 236 is in continuity with the fourth terminal 238.

The third relay 206 suitably includes four terminals 242–248. The first and second terminals 242 and 244 are coupled to an actuation coil, the actuation coil operable to toggle an internal switch of the third relay 206. The internal switch of the first relay 202 is normally positioned such that a connection between the third and fourth terminals 246 and 248 is in an open (non-continuity) configuration. When the actuation coil is actuated, the internal switch of the third relay 206 is toggled such that the third and fourth terminals 246 and 248 are in continuity with each other.

The control module 106 generates command signals to control the operation of the recording device 108. The control module 106 creates commands signals by altering the current, such as by amperage and/or voltage alterations, transmitted along a LANC command signal wire 265 in a manner well known in the art. The electronics of the control module 106 are based upon well known circuitry used in the manufacture of hard wired LANC remote controls for camcorders, and is able to produce suitable command signals for transmission through the command signal wire 265 to control the operation of the recording device 108. One suitable circuit board for use in the control module 106 is sold by Keene Electronics of Little Eaton, Derbyshire, United Kingdom, as contained in their LANC remote control, product number LKR.

The control module 106 includes eight terminals 250–264. The sixth terminal 260 is coupled to a LANC power supply wire 266, thereby providing operating power to the control module 106. The main ground wire 218 is coupled to the seventh terminal 262 thereby grounding the control module 106. When the fifth terminal 258 is placed in continuity with the third and fourth terminals 254 and 256, the control module 106 is thereby actuated to send a well known record command signal through the command signal wire 265. When the second, third, and fourth terminals 252, 254, and 256 are placed in continuity with each other, the control module 106 is thereby actuated to send a well known power toggle command signal through the command signal wire 265, which toggles the recording device 108 between a power-on and a power-off condition. The eighth terminal 264 is coupled to the visual or audio indicator 114 or 116, and is operable to power the visual or audio indicator 114 or 116 in a selected manner to indicate the presence of a selected operating parameter of the recording device 108, imaging device 110, or communication system 104 as described above in reference to FIG. 1.

In operation, the switch 107 is activated by the user, momentarily grounding, and thereby activating, the activation coil of the second relay 204, thus momentarily toggling the internal switch of the second relay 204 so that the third and fourth terminals 236 and 238 are momentarily placed in continuity with one another. Thus, terminals 252, 254, and 256 of the control module 106 are placed in continuity with one another, thereby actuating the control module 106 to send a well known power toggle command signal through the command signal wire 265, toggling the recording device 108 from a power-off configuration to a power-on condition. Once the recording device 108 is placed in a power-on configuration, power is provided from the recording device 108 to the main power line 214.

The main power line 214 provides current to the imaging device 110, light 136 and to the actuation coil of the first relay 202, thereby activating the first relay 202. Once the first relay 202 is activated, terminals 226 and 228 are in continuity with one another, thereby by connecting the main power line 214 in continuity with the activation coil of the second relay 204 at terminal 234.

Once power is provided to the control module 106 through the LANC power supply wire 266, power is provided to terminal 250 of the control module 106. The power passes through a signal device coupled to the communication system 104. Upon activation, the signal device is adapted to repeatedly send a command signal to the recording device 108. In the illustrated embodiment, the signal device includes a "blinking" diode 212. The power from the control module 106 pass through the blinking diode 212 before reaching the third relay 206.

The blinking diode 212, a component well known in the art, provides a cyclic power source to the second terminal 244 of the third relay 206. Thus, the activation coil of the third relay 206 is cyclically activated, thereby cyclically placing terminals 246 and 248 in continuity. Terminal 248 is in continuity with terminals 240 and 236 of the second relay (when the second relay 204 is in its normal de-activated condition), and thereby terminals 254 and 256 of the control module 106. When terminals 258, 254, and 256 are in continuity with one another, a record command signal is sent from the command module 106, via the LANC command signal wire 265 to the recording device 108, instructing the recording device to record.

By forcing the command module 106 to cyclically send a record signal, the operability of the mobile imaging system 200 is enhanced, since a momentary break in a connection in the mobile imaging system 200 does not result in a permanent stoppage of recording, since as soon as the connection is remade, a record command signal will automatically have been sent to the recording device 108.

The third switch 210 allows a temporary disconnect of the LANC command signal wire 265 from the recording device 108, such that the recording device 108 may be operated with its local controls without interference from command signals from the control module 106, such as the cyclic record command signal.

Of note, a second switch 208 is provided on a negative wire 216 coupled to the light 136 such that the second switch 208 may be opened to interrupt current flow to the light 136 should a user wish to operate the imaging device 110 separately of the light 136 when lighting conditions permit. Alternatively, the second switch 208 may be placed on the positive leg of the light 136 circuit as should be apparent to one skilled in the art.

A voltage converter 274 may be provided to convert the incoming voltage provided by the recording device 108 to a specific voltage required by the imaging device 110. A buzzer 276 may be provided in continuity with terminals 232 and 234 of the second relay 204 such that a user is provided with an audio indication of when switch 107 has been activated. The visual and audio indicators 114 and 116 may be coupled in continuity with terminal 264 of the control module 106. Terminal 264 is coupled to a terminal of the control module 106 adapted to produce an electrical signal in a selective pattern, the pattern selected to indicate a selective operating parameter of the recording device, such as that the recording device 108 is in a record mode, at or near end of media storage capacity, power off mode, etc. The visual and/or audio indicators 114 and 116 are adapted to convert this electrical signal to emit a visual or audio emission in a selected pattern to indicate a selected operating parameter of the recording device 108, imaging device 110, or communication system 104 as described above The microphone 112 and imaging device 110 are coupled to the audio/video port 130 by methods well known in the art, therefore will not be described further herein for the sake of brevity.

From the above description, it should be apparent to those skilled in the art that by toggling switch 107 between an open and a closed position, the mobile imaging system 100 may be configured from a power off condition to a recording condition, and likewise, configured from a record condition to a power off condition.

Figures 3, 4:
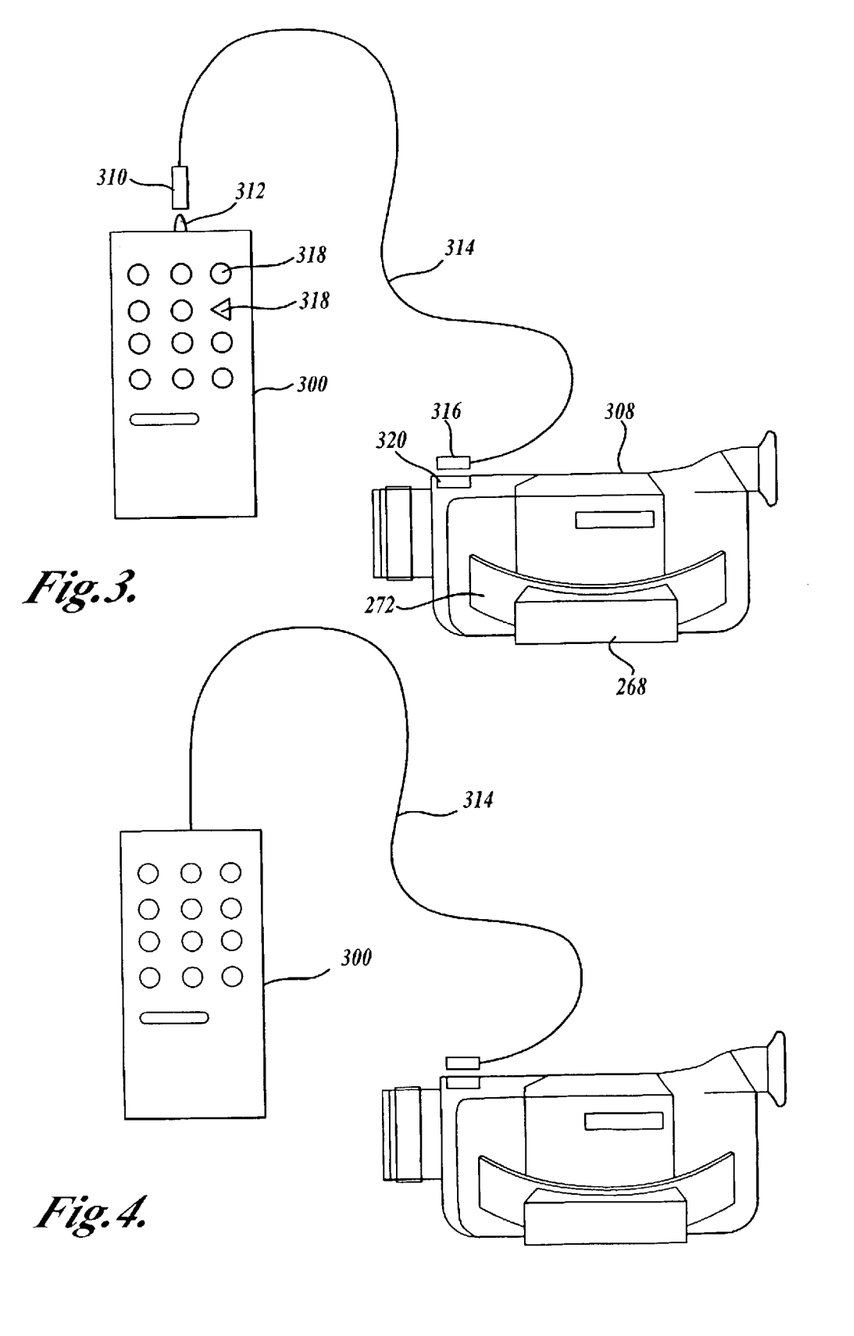
FIG. 3 is a planar view of a portion of a mobile imaging system formed in accordance with one embodiment of the present invention and suitable for use with a wireless control unit.
FIG. 4 is a planar view of the portion of the mobile imaging system of FIG. 3, formed in accordance with another embodiment of the present invention and suitable for use with a wireless control unit.

As may be best seen by referring to FIG. 3, a well known control unit 300, such as a wireless remote control, may alternatively be used to control operation of a remotely located recording device 308. The control unit 300 controls operation of the recording device 308 through the transmission of wireless command signals, such as infrared command signals, radio frequency command signals, etc., to a wireless command signal receptor 320 located on the recording device 308. Inasmuch as such systems are well known in the art and available as off-the-shelf components, the internal structure and operation of these components will not be described in detail herein for the sake of brevity.

In the alternate embodiment of FIG. 3, a first converter 310 is disposed in proximity to a wireless command signal transmission port 312 of the control unit 300. The wireless command signal transmission port 312 is configured to transmit wireless command signals to the recording device 308. The first converter 310 converts the wireless command signals into electrical signals transmittable along a cable 314 to a second converter 316. The second converter 316 converts the electrical signals back into a wireless command signal format amenable for receipt by the wireless command signal receptor 320 of the remotely located recording device 308. In the illustrated embodiment, the control unit 300 emits infrared wireless command signals, wherein the first converter 310 is an infrared diode adapted to convert the wireless command signals into electrical signals. Likewise, the second converter 316 is also an infrared diode adapted to convert the electrical signals back into infrared wireless command signals.

In operation, a user may place the control unit 300 in a convenient location, such as attached to a portion of the user's garments. The recording device 308 may be placed in a location out of a line of sight of the control unit 300, such as in a backpack (not shown) worn upon the back of the user. The user may then press one of the control buttons 318, such as record, pause, stop, etc., on the control unit 300. The wireless command signals generated by the control unit 300 upon activation of one of the control buttons 318 are then converted by the first converter 310, transmitted along the cable 314, and then converted back into wireless command signals by the second converter 316 for receipt by the wireless command signal receptor of the remotely located recording device 308.

Referring to FIG. 4, an alternate embodiment of the invention is depicted. This alternate embodiment is similar to the embodiment depicted in FIG. 3 with the exception that the first converter 310 is eliminated by hard wiring the cable 314 directly to the control unit 300, such that the cable 314 receives electrical command signals directly from the control unit 300 prior to being converted to wireless command signals. In all other aspects, this alternate embodiment is identical to the embodiment depicted in FIG. 3, therefore for the sake of brevity, this embodiment will not be described further herein.

Figure 5:
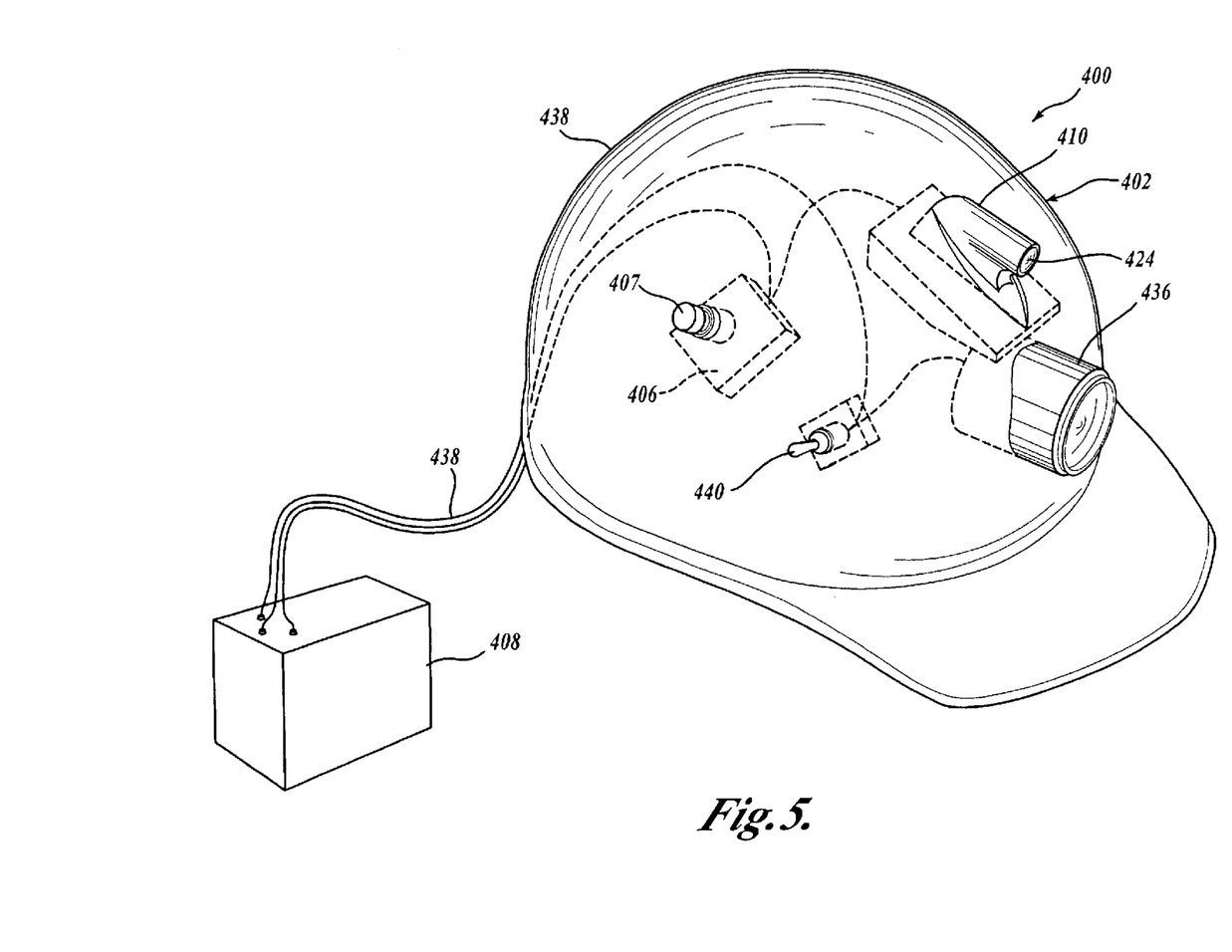
FIG. 5 is a perspective view of a mobile imaging system formed in accordance with an alternate embodiment of the present invention.

Referring to FIG. 5, a mobile imaging system 400 formed in accordance with another embodiment of the present invention is illustrated. The embodiment of FIG. 5 is substantially similar to the embodiment depicted in FIG. 1, with the exception that the support apparatus 402 is in the form of a hard hat. In addition, a light source 436 has been added to illuminate the environment surrounding the user. Inasmuch as the remaining portions of the mobile imaging system 400 are substantially similar in both materials and operation to the previously described embodiments, the detailed description of this alternate embodiment will only focus on the departures from the previously described embodiments for the sake of brevity.

An imaging device 410, such as the alternate embodiment depicted in FIG. 4, is suitably coupled to an outer shell 438 of the support member 402. More specifically, the imaging device 410 passes through an aperture in the outer shell 438 and is secured to the outer shell 438 by any well known fastening device. The imaging device 410 may be protected from contaminate intrusion, such as moisture, dirt, etc., by encasing the imaging device in a protective housing. For instance, the imaging device 410 may be coated with a liquid that cures into a solid to form a protective housing about the imaging device 410.

The imaging device 410 is located substantially within a cavity defined by the outer shell 428 and a head of a user when the support member 402 is donned. In the illustrated embodiment, the lens 424 of the imaging device 410 is oriented substantially flush with the outer shell 428 such as to extend about a ½ inch or less from the outer shell 428. As configured, the imaging device 410 provides minimal, if any, obstruction to the user's vision during use and/or provides a pleasing aesthetic look.

A control module 406, identical to the control module 106 described in relation to the embodiment depicted in FIG. 1, is also located within the cavity defined above. A suitable switch 407 is disposed through an aperture in the outer shell 428 so as to be accessible to a user. Further, a second switch 440 is also mounted to the outer shell 428 so as to be accessible to a user and permits selective operation of the imaging device 410 separately of the light 436. A remotely located recording device 408 is coupled to the control module 406 in an identical manner as described for the above embodiments.

Figure 6:
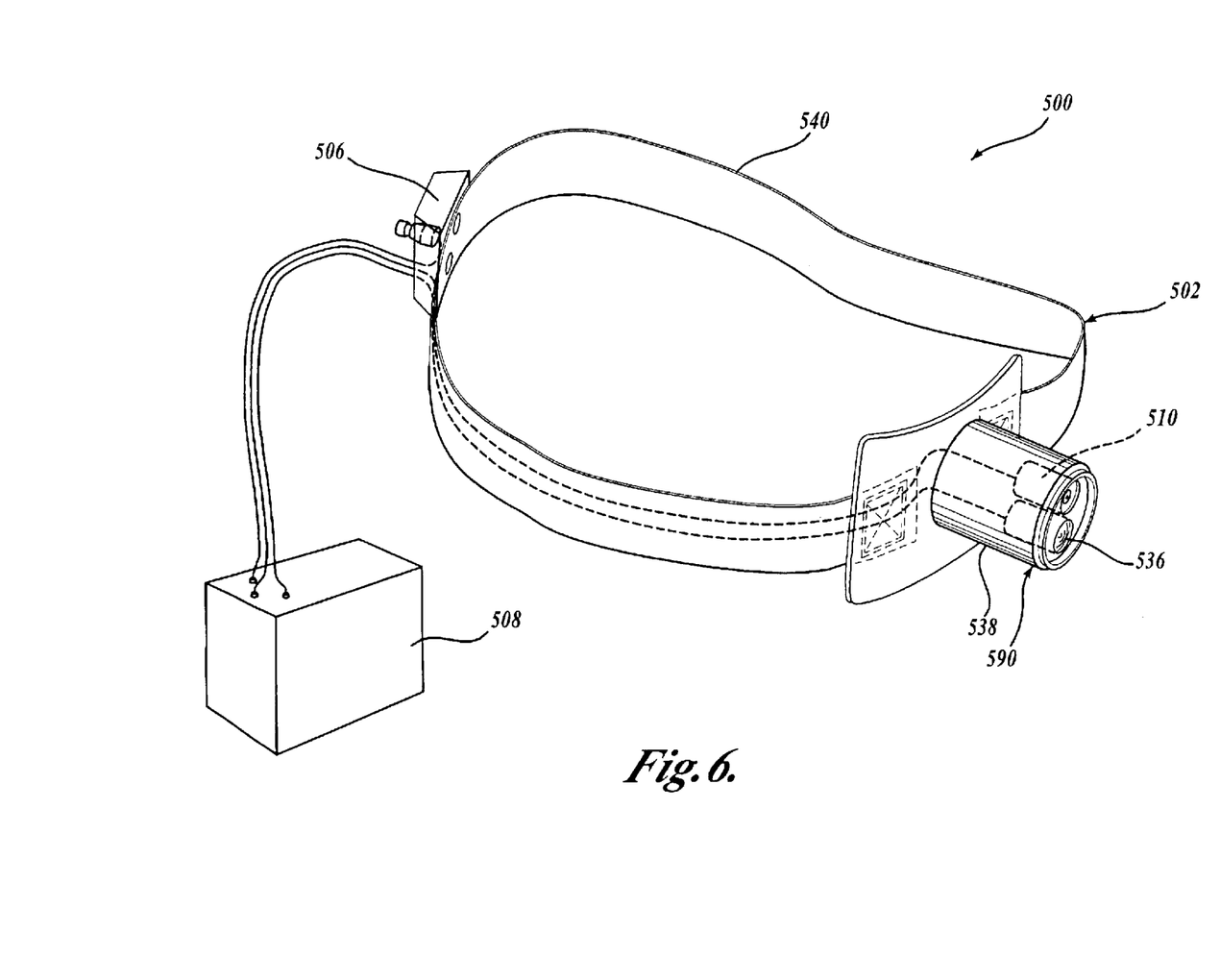
FIG. 6 is a perspective view of a mobile imaging system formed in accordance with another embodiment of the present invention.

Referring to FIG. 6, a mobile imaging system 500 formed in accordance with yet another embodiment of the present invention is depicted. The mobile imaging system 500 is substantially similar to the embodiment depicted in FIG. 1, with the exception that the support apparatus 502 is in the form of a head lamp 590 having a light source 536 located within a protective housing 538. Inasmuch as the remaining portions of the mobile imaging system 500 are substantially similar in materials and operation to the previously described embodiments, the detailed description of this alternate embodiment will focus only on departures from the previously described embodiments.

The mobile imaging system 500 includes an imaging device 510 disposed within the protective housing 538 of a head lamp 590. More specifically, the imaging device 510 passes through an aperture in a reflective shield (not shown) of the head lamp 590 and is secured to the aperture by any well known fastening methods. By placing the imaging device 510 within the protective housing 538, the imaging device 510 may be protected from contaminate intrusion, such as moisture, dirt, etc. A control module 506, is suitably attached to a head band 540 of the support apparatus 502, which in turn is coupled in signal communication to remotely located recording device 508.

Figure 7:
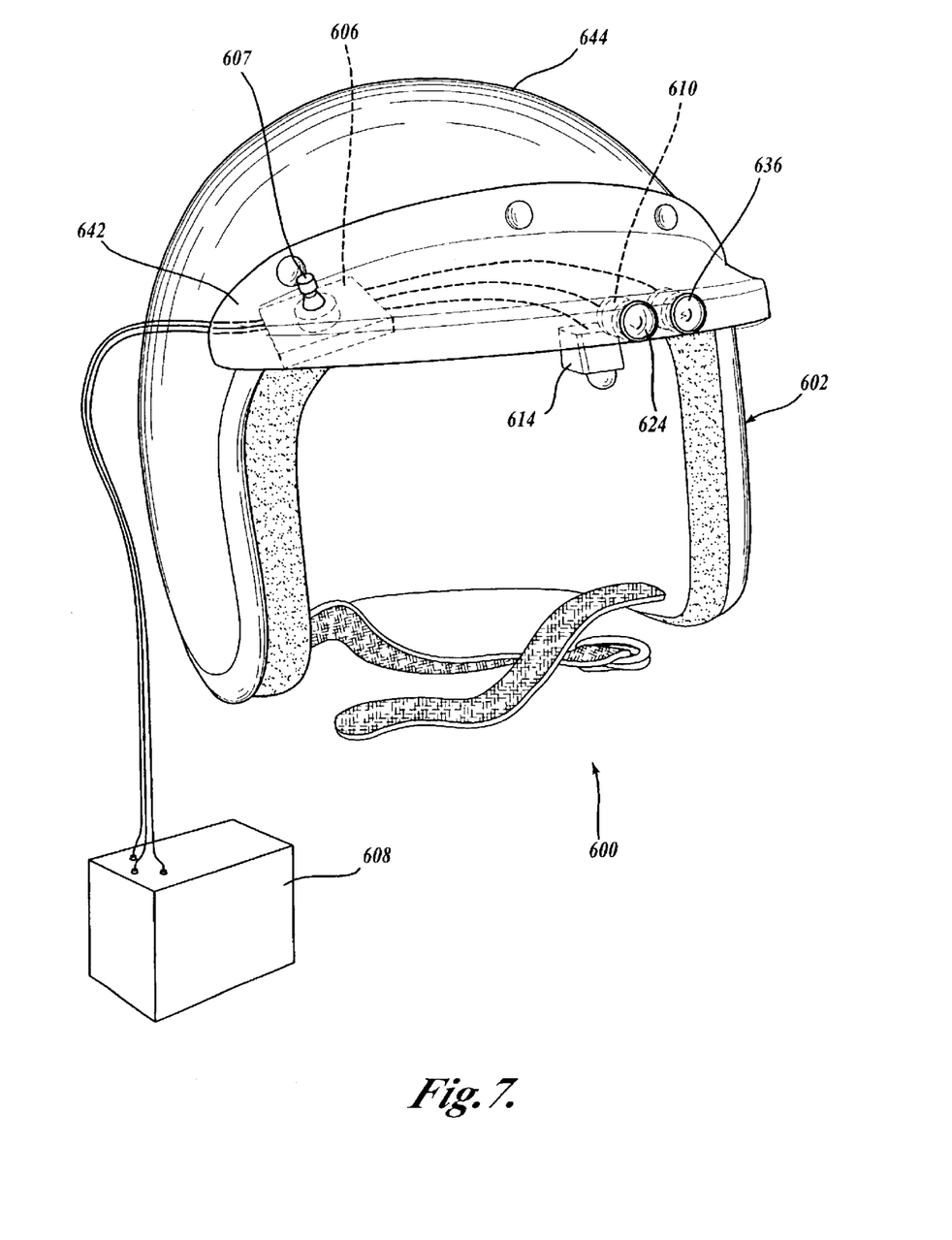
FIG. 7 is a perspective view of a mobile imaging system formed in accordance with another embodiment of the present invention.

Referring to FIG. 7, a mobile imaging system 600 formed in accordance with another embodiment of the present invention is depicted. The mobile imaging system 600 is substantially similar to the embodiment depicted in FIG. 1, with the exception that the support apparatus 602 is in the form of a visor 642 adaptable to be worn upon a head of a user, such as by attaching the visor 642 to a helmet 644 worn upon the head of the user. Inasmuch as the remaining portions of the mobile imaging system 600 are substantially similar in both materials and operation to the above described embodiments, the detailed description of this alternate embodiment will focus only on the departures from the previously described embodiments.

The mobile imaging system 600 includes an imaging device 610 having a lens 624, the imaging device 610 coupled to the visor 642 of the support member 602. More specifically, the imaging device 610 passes through an aperture in the visor 642 and is secured to the visor 642 by any well known fastening methods. The imaging device 610 may be protected from contaminate intrusion, such as moisture, dirt, etc., by encasing the imaging device in a protective housing, as previously described.

The lens 624 of the imaging device 610 is oriented substantially flush with the outer surface of the visor 642 such as to extend about a ½ inch or less from the outer surface of the visor 642. As configured, the imaging device 610 provides minimal, if any, obstruction of the user's vision during use and/or provides a pleasing aesthetic look.

A control module 606 is coupled to the underside of the visor 642 and is in communication with a recording device 608. A switch 607 is disposed through an aperture in the visor 642 so as to be accessible to a user donning the mobile imaging system 600.

A visual indicator 614 is suitably mounted to the underside of the visor 642 by any well known fastening methods. Further, a light 636 for illuminating the environment surrounding the user is also mounted to the underside of the visor 642 by any well known fastening methods.

Figure 8:
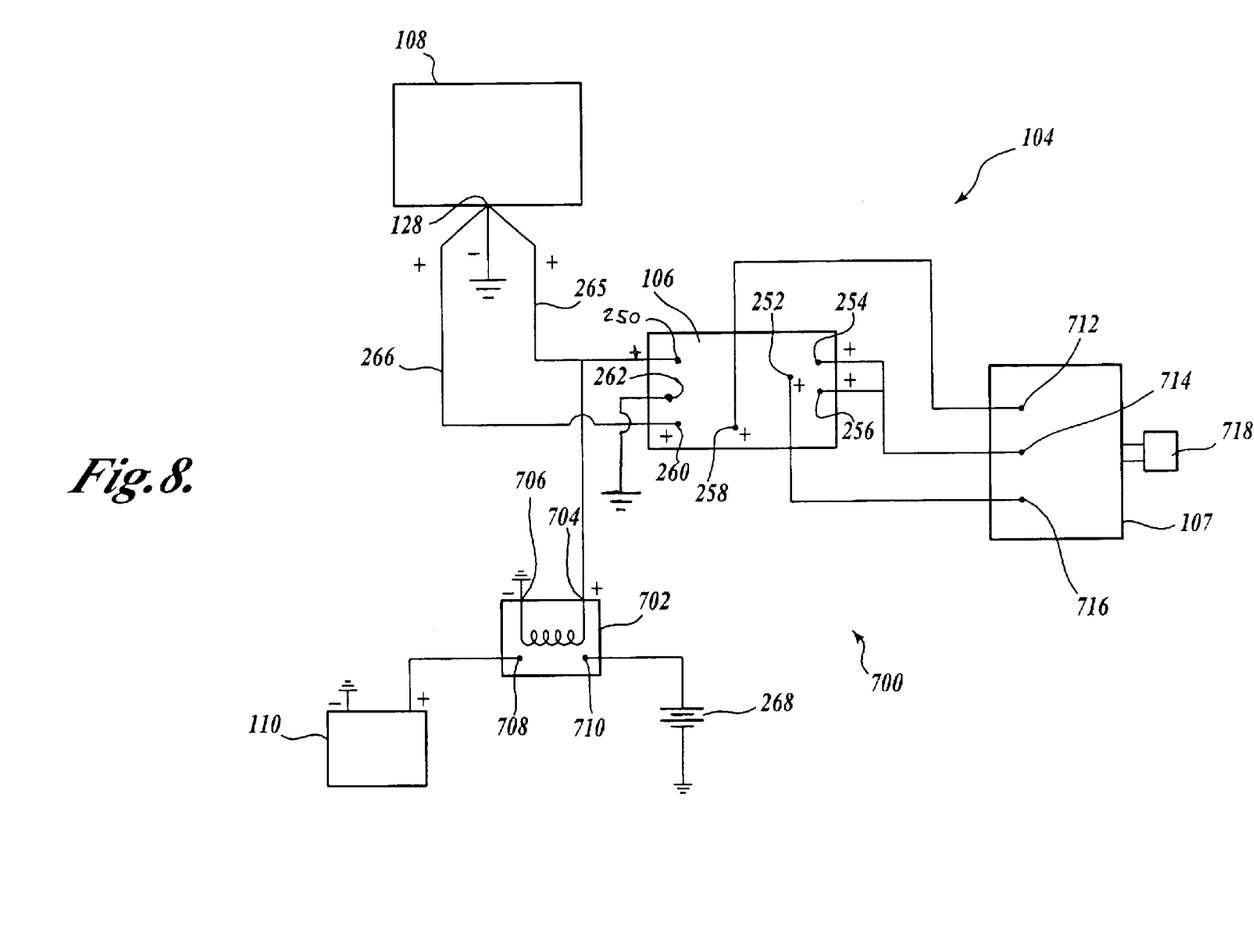
FIG. 8 is a diagrammatical wiring diagram of a mobile imaging system formed in accordance with an alternate embodiment of the present invention.

Referring to FIG. 8, a mobile imaging system 700 formed in accordance with another embodiment of the present invention is depicted. The alternate embodiment is suitable for use with the embodiments of the present invention illustrated in FIGS. 1 and 3–7. The communication system 104, control module 106, remotely located recording device 108, and imaging device 10 are substantially similar to those described in the embodiment described in reference to and illustrated in FIG. 1, therefore these items will not be described further herein, and further, will retain the same reference numerals.

Referring to FIG. 8, a diagrammatical wiring diagram of the mobile imaging system 700 will now be described in greater detail. The diagram depicts one method of coupling a recording device 108 with the mobile imaging system 700. As noted above, the recording device 108 is a standard off-the-shelf recording device, such as camcorders manufactured by SONY or CANNON having Local Area Network Connection (LANC) capabilities. The communication system 104 couples to a LANC port 128. The control module 106, which generates command signals to control the operation of the recording device 108, is shown at the center of the diagram.

The major components of the communication system 104 include a first relay 702, a switch 107, and a supplemental power source 268 and wiring interconnecting the various components.

The first relay 702 suitably includes four terminals 704–710. The first and second terminals 704 and 706 are coupled to an actuation coil, the actuation coil operable to toggle an internal switch of the first relay 702. The internal switch of the first relay 702 is normally positioned in an open position such that the third and fourth terminals 708 and 712 are not in continuity with one another. When the actuation coil is actuated, the internal switch of the first relay 702 is toggled such that the third and fourth terminals 708 and 710 are in continuity with one another, such that power provided from the supplemental power source 268 is provided to the imaging device 110.

The switch 107 suitably includes three terminals 712–716. In the switch's 107 normal position, terminals 712 and 714 are in continuity with one another. When the switch 107 is momentarily activated by pressing on an actuation button 718, terminals 712 and 714 are placed in an open state (i.e. terminals 712 and 714 are no longer in continuity with one another), and terminals 714 and 716 are placed in continuity with one another.

Focusing now on the supplemental power source 268, the supplemental power source 268 may be coupled to the mobile imaging system 100 to provide supplemental power. The supplemental power source 268 may be used to augment the power source of the remotely located recording device 108, fully provide the power for the remotely located recording device 108, power the systems of the mobile imaging system 700 at the exclusion of the remotely located recording device 108 (as shown), or combinations thereof. In the illustrated embodiment, the supplemental power source 268 is suitably a direct current (DC) battery source, which is coupled to the fourth terminal 710 of the first relay 702. Referring to FIG. 3, the supplemental power source 268 may be attached to a support strap 272 of the remotely located recording device 308 by any well known method, such as by using hook and loop fasteners.

In operation, when the LANC power supply wire 266 is plugged into the recording device 108, power is supplied to the first terminal 704 of the first relay 702, thereby actuating the actuation coil of the first relay 702. Once the first relay 702 is actuated, terminals 708 and 710 are placed in continuity with one another, allowing the power provided by the supplemental power source 268 to flow to the imaging device 110 to power the imaging device 110.

Further, when the LANC power supply wire 266 is plugged into the recording device 108, power is also supplied to the control module 106 through terminal 260. By pressing the actuation button 718, the switch 107 is configured such that terminals 714 and 716 are placed in continuity with one another, thereby placing terminals 252, 254, and 256 in continuity with one another. As described above with reference to the control module 106 of FIG. 2, by placing terminals 252, 254, and 256 in continuity with one another, the control module 106 is actuated to send a well known power toggle command signal through the command signal wire 265, toggling the recording device 108 from a power-off configuration to a power-on condition.

When the actuation button 718 is released, terminals 712 and 714 are once again placed in continuity with one another, thereby placing terminals 254, 256, and 258 in continuity with one another. As described above with reference to the control module 106 of FIG. 2, by placing terminals 254, 256, and 258 in continuity with one another, the control module 106 is actuated to send a well known record command signal through the command signal wire 265, configuring the recording device 108 into a record mode.

When the actuation button 718 is momentarily pressed for the second time, the switch 107 is configured such that terminals 714 and 716 are temporarily placed in continuity with one another, thereby placing terminals 252, 254, and 256 in continuity with one another. As described above with reference to the control module 106 of FIG. 2, by placing terminals 252, 254, and 256 in continuity with one another, the control module 106 is actuated to send a well known power toggle command signal through the command signal wire 265, toggling the recording device 108 from the power-on configuration to the power-off configuration.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A mobile imaging system for capturing images and transmitting those images to a recording device, the mobile imaging system comprising;
   (a) a support apparatus adapted to be worn by a user;
   (b) an imaging device coupled to the support apparatus, the imaging device adapted to receive and convert light into video signals for recordation by a recording device;
   (c) a communication system adapted to be in communication with the imaging device and the recording device to transfer the video signals therebetween; and
   (d) a switch coupled to the communication system, the switch actuatable between first and second positions, wherein when the switch is actuated from the first position to the second position, a selected operating parameter of both the recording device and the imaging device is altered.

2. The mobile imaging system of claim 1, wherein when the switch is in the first position, the imaging device and the recording device are both configured in a power on mode.

3. The mobile imaging system of claim 1, wherein when the switch is in the second position, the imaging device and the recording device are both configured in a power off mode.

4. The mobile imaging system of claim 1, wherein when the switch is in the first position, the imaging device is thereby configured in a power on mode and the recording device is thereby configured in a record mode.

5. The mobile imaging system of claim 1, wherein the switch is a push button switch.

6. The mobile imaging system of claim 1, further including a visual indicator coupled to the support apparatus and that is in signal communication with the communication system, the visual indicator adapted to visually indicate to the user a status of the selected operating parameter of the recording device.

7. The mobile imaging system of claim 6, wherein the visual indicator is adapted to emit light in a selected manner to indicate the status of the selected operating parameter of the recording device.

8. The mobile imaging system of claim 6, wherein the selected operating parameter is that the recording device is near or has reached a maximum media storage capacity limit.

9. The mobile imaging system of claim 6, wherein the selected operating parameter is that at least one of the recording device, communication system or imaging device is malfunctioning.

10. The mobile imaging system of claim 6, wherein the visual indicator is adapted to emit light in a selected manner to indicate when the recording device is recording.

11. The mobile imaging system of claim 1, further including a first microphone and a second microphone coupled to the support apparatus at a selected separation distance and coupled in signal communication with the communication system.

12. The mobile imaging system of claim 1, further comprising a light source coupled to the support apparatus, the light source adapted to illuminate an environment surrounding the user.

13. The mobile imaging system of claim 1, wherein the communication system further includes an audio indicator, the audio indicator adapted to emit an audible sound to indicate a status of a selected operating parameter of the recording device, communication system, or imaging device.

14. The mobile imaging system of claim 1, wherein the switch is coupled to the support apparatus.

15. The mobile imaging system of claim 1, wherein a majority of the imaging device is located between an outer surface of the support apparatus and a head of the user when the support apparatus is donned by the user.

16. The mobile imaging system of claim 1, wherein the support apparatus is goggles.

17. The mobile imaging system of claim 16, wherein the goggles include a substantially transparent barrier coupled to a frame, wherein at least a portion of the imaging device passes through an aperture in the substantially transparent barrier.

18. The mobile imaging system of claim 16, wherein the goggles include a substantially transparent barrier coupled to a frame thereby forming a cavity between the substantially transparent barrier, the frame, and a face of a user when the goggles are worn, wherein at least a portion of the imaging device is disposed within the cavity.

19. The mobile imaging system of claim 18, wherein a lens of the imaging device is attached to the goggles so as to be substantially flush with the substantially transparent barrier.

20. The mobile imaging system of claim 1, wherein the support apparatus is a visor.

21. The mobile imaging system of claim 1, wherein the support apparatus is a helmet.

22. The mobile imaging system of claim 1, wherein the support apparatus is a headlamp and the imaging device is located within a housing of the headlamp.

23. The mobile imaging system of claim 1, further including a portable power source coupled to the communication system.

24. The mobile imaging system of claim 23, wherein the portable power source is adaptable to provide power to the imaging device.

25. The mobile imaging system of claim 23, wherein the portable power source is adaptable to provide power to the imaging device and the recording device.

26. The mobile imaging system of claim 23, wherein the portable power source is adapted to be carried upon a holding strap of the remotely recording device.

27. The mobile imaging system of claim 1, further including a signal device coupled to the communication system, the signal device adapted, once activated, to repeatedly send a command signal to the recording device.

28. The mobile imaging system of claim 27 wherein the command signal is a command signal to configure the recording device in a record mode.

29. The mobile imaging system of claim 1, wherein the communication system is adaptable to connect to the recording device to draw power therefrom to power the imaging device.

30. The mobile imaging system of claim 1, wherein the communication system is operable to connect to a charging port of the recording device to draw power therefrom to power the imaging device.

31. The mobile imaging system of claim 1, wherein the communication system is adapted to connect and communicate through a local area network connection port of the recording device.

32. The mobile imaging system of claim 1, wherein the imaging device is located remotely of the recording device.

33. The mobile imaging system of claim 1, wherein the imaging device is adapted to be worn upon a head of the user.

34. The mobile imaging system of claim 1, wherein when the support apparatus is worn by a user, an image axis of the imaging device passes within about two inches of an imaginary line intersecting the pupils of a user's eyes.

35. The mobile imaging system of claim 1, wherein when the support apparatus is worn by a user, an image axis of the imaging device passes within about one inch of an imaginary line intersecting the pupils of a user's eyes.

36. A mobile imaging system operable to capture and transmit image data to a portable recording device, the portable recording device adapted to receive command signals regulating the operation of the portable recording device from a wireless remote control, the mobile imaging system comprising:
   (a) an imaging device operable to receive light and convert the received light into a format amenable for processing by a remotely located portable recording device;
   (b) a communication system adapted to couple the imaging device and the remotely located portable recording device in signal communication;
   (c) a control unit operable to generate command signals operable to control the operation of the remotely located portable recording device;
   (d) a cable coupled to the control unit for transmitting electrical command signals generated in the control unit through the cable; and
   (e) a first converter coupled to the cable, the first converter operable to convert the command signals transmitted through the cable into a wireless command signal amenable for processing by the remotely located portable recording device.

37. The mobile imaging system of claim 36, wherein the first converter is operable to convert the electrical command signals into wireless infrared command signals for receipt by the remotely located portable recording device.

38. The mobile imaging system of claim 36, further including a second converter coupled to the cable, the second converter adaptable to convert wireless command signals emitted from the control unit into the electrical command signals for transmission through the cable to the first converter.

39. A mobile imaging system for capturing images of an environment surrounding a user of the mobile imaging system and transmitting those images to a remotely located recording device, the mobile imaging system comprising;
   (a) a support member adapted to be worn by a user;
   (b) an imaging device coupled to the support member, the imaging device operable to receive light and convert the received light into video signals amenable for recordation by the remotely located recording device;
   (c) a communication system adapted to couple the imaging device in signal communication with the remotely located recording device and transfer the video signals therebetween; and
   (d) a visual indicator coupled to the support member and in signal communication with the communication system, the visual indicator adapted to visually indicate to the user an operating status of the remotely located recording device.

40. The mobile imaging system of claim 39, wherein the visual indicator is adapted to emit light in a selected manner to indicate the operating status of the remotely located recording device.

41. The mobile imaging system of claim 39, wherein the visual indicator is adapted to emit light in a selected manner when the remotely located recording device is recording.

42. The mobile imaging system of claim 39, wherein the operating status that the remotely located recording device is near or has reached its maximum media storage capacity.

43. A mobile imaging system for capturing images of an environment surrounding a user of the mobile imaging system and transmitting those images to a remotely located recording device, the mobile imaging system comprising;
   (a) an imaging device adapted to be worn by a user, receive light, and convert the received light into video signals amenable for recordation by the remotely located recording device;
   (b) a communication system adapted to couple the imaging device in signal communication with the remotely located recording device and transfer the video signals therebetween; and
   (c) a switch coupled to the communication system, the switch adapted to control the operation of both the imaging device and the remotely located recording device through the communication system.

* * * * *

UNITED STATES PATENT AND TRADEMARK OFFICE
CERTIFICATE OF CORRECTION

PATENT NO. : 6,717,737 B1
DATED : April 6, 2004
INVENTOR(S) : K. Haglund

It is certified that error appears in the above-identified patent and that said Letters Patent is hereby corrected as shown below:

Column 14,
Line 22, "harrier" should read -- barrier --
Line 54, "the remotely recording" should read -- the recording --
Line 59, "claim 27" should read -- claim 27, --

Signed and Sealed this

Nineteenth Day of October, 2004

JON W. DUDAS
*Director of the United States Patent and Trademark Office*